US011072306B2

(12) United States Patent
Divo et al.

(10) Patent No.: US 11,072,306 B2
(45) Date of Patent: Jul. 27, 2021

(54) GAS GENERATOR

(71) Applicant: JOYSON SAFETY SYSTEMS GERMANY GMBH, Aschaffenburg (DE)

(72) Inventors: Hans-Jürgen Divo, Langenau (DE); Jochen Benz, Ulm (DE); Christine-Martina Ganso, Bibertal (DE); Roland Schnabl, Ulm (DE); Gerhard Klingauf, Balzheim (DE)

(73) Assignee: Joyson Safety Systems Germany GmbH, Aschaffenburg (DE)

( * ) Notice: Subject to any disclaimer, the term of this patent is extended or adjusted under 35 U.S.C. 154(b) by 52 days.

(21) Appl. No.: 16/621,938

(22) PCT Filed: Aug. 16, 2018

(86) PCT No.: PCT/DE2018/200077
§ 371 (c)(1),
(2) Date: Dec. 12, 2019

(87) PCT Pub. No.: WO2019/052609
PCT Pub. Date: Mar. 21, 2019

(65) Prior Publication Data
US 2020/0122681 A1 Apr. 23, 2020

(30) Foreign Application Priority Data
Sep. 15, 2017 (DE) .................... 10 2017 216 384.4

(51) Int. Cl.
*B60R 21/264* (2006.01)
*B60R 21/261* (2011.01)
*B60R 21/26* (2011.01)

(52) U.S. Cl.
CPC .......... *B60R 21/264* (2013.01); *B60R 21/261* (2013.01); *B60R 2021/2612* (2013.01);
(Continued)

(58) Field of Classification Search
CPC ................ B60R 21/261; B60R 21/264; B60R 2021/26076; B60R 2021/26082; B60R 2021/26088; B60R 2021/2612
See application file for complete search history.

(56) References Cited

U.S. PATENT DOCUMENTS 6,073,963 A    6/2000 Hamilton
6,644,198 B1*  11/2003 Avetisian ................ F42B 3/103
                                                    102/202.14
(Continued)

FOREIGN PATENT DOCUMENTS

DE        100 31 865 C1     1/2002
DE     60 2005 002 281 T2   1/2008
(Continued)

OTHER PUBLICATIONS

International Search Report dated Jan. 2, 2019 issued in PCT/DE2018/200077; filed Aug. 16, 2018.
(Continued)

*Primary Examiner* — Barry Gooden, Jr.
(74) *Attorney, Agent, or Firm* — Gordon Rees Scully; Mansukhani, LLP

(57) ABSTRACT

The invention relates, among other things, to a gas generator for generating a driving gas for a vehicle safety device, wherein the gas generator comprises: an ignition device; fuel which, after ignition using the ignition device, generates the driving gas; an at least partially tubular carrier element, in the tube interior of which a combustion chamber for the fuel is located; an injection-moulded body which fixes the ignition device in the connection hole and is located with an inner portion inside the carrier element and with an outer portion outside the carrier element; a feed pipe which is connected to a pipe end of the carrier element and which
(Continued)

Figure 1:
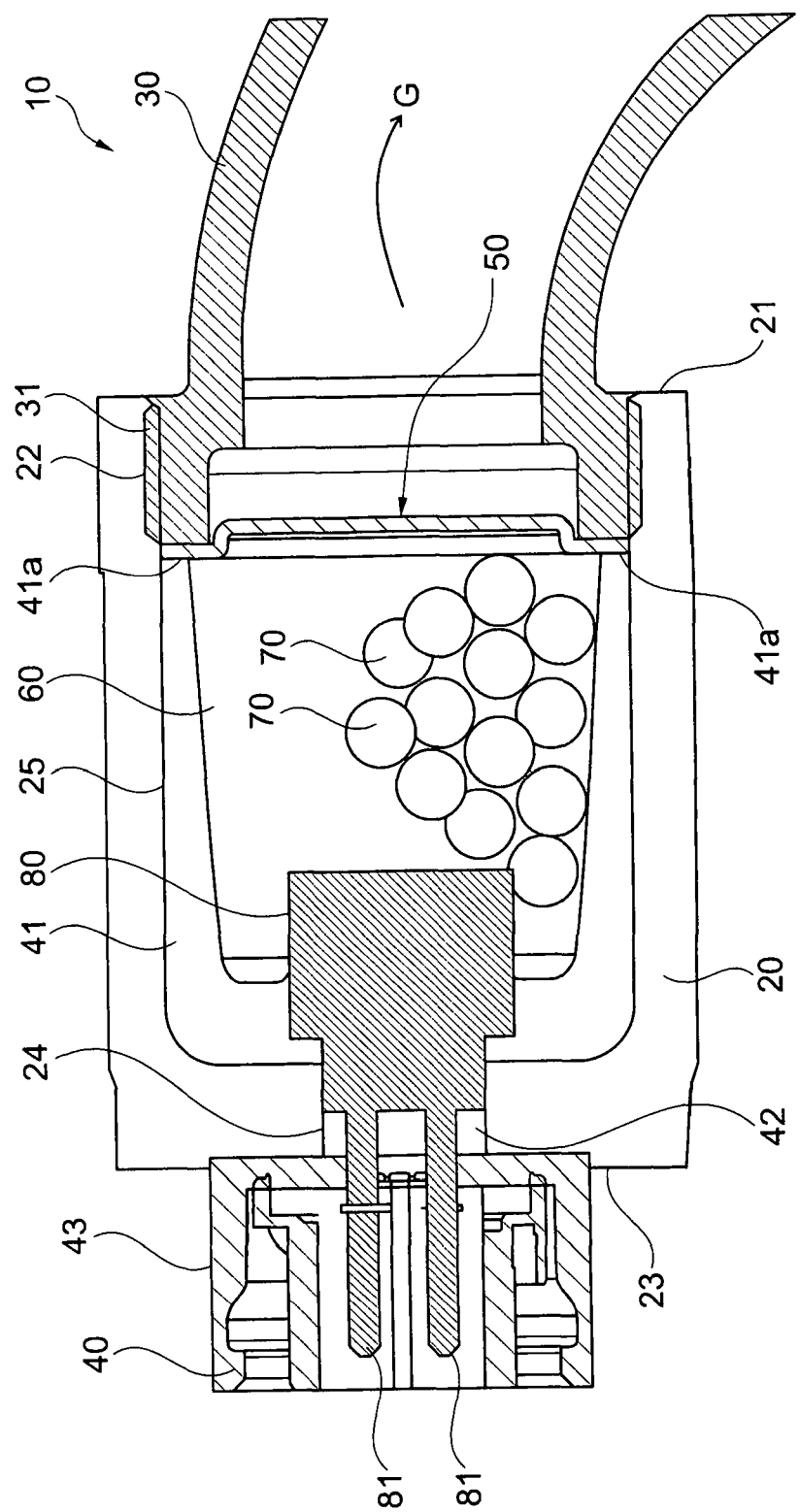

conveys the driving gas out of the combustion chamber; and a lid sealing the combustion chamber.

15 Claims, 4 Drawing Sheets

(52) U.S. Cl.
CPC ............... *B60R 2021/26029* (2013.01); *B60R 2021/26088* (2013.01)

(56) References Cited

U.S. PATENT DOCUMENTS

| | | | |
|---|---|---|---|
| 6,718,884 | B1 | 4/2004 | Yabuta et al. |
| 9,428,142 | B2 | 8/2016 | Divo et al. |
| 2002/0008373 | A1 | 1/2002 | Specht |
| 2008/0150266 | A1* | 6/2008 | Gmitter .................... C06D 5/06 280/741 |
| 2010/0194085 | A1* | 8/2010 | Mayville ............... B60R 21/264 280/741 |
| 2012/0079958 | A1* | 4/2012 | Nakayasu ............. B60R 21/272 102/530 |
| 2012/0112442 | A1 | 5/2012 | Parks et al. |
| 2014/0090572 | A1* | 4/2014 | Nakashima ........... B60R 21/264 102/363 |
| 2015/0171541 | A1* | 6/2015 | Isenmann ............. B60R 21/264 102/202.7 |

FOREIGN PATENT DOCUMENTS

| | | |
|---|---|---|
| DE | 10 2007 023 046 A1 | 11/2008 |
| DE | 10 2012 023 031 A1 | 5/2014 |
| EP | 0 488 937 A2 | 6/1992 |
| EP | 0 488 937 A3 | 6/1992 |
| EP | 0 943 503 A2 | 9/1999 |
| EP | 1 564 090 A1 | 8/2005 |
| WO | 02/02375 A1 | 1/2002 |
| WO | 2013/027691 A1 | 2/2013 |
| WO | 2013/075710 A2 | 5/2013 |
| WO | 2013/075710 A3 | 5/2013 |

OTHER PUBLICATIONS

German Examination Report dated Jul. 9, 2018 issued in German Patent Application No. 10 2017 216 384.4; filed Sep. 15, 2017.

\* cited by examiner

GAS GENERATOR

The invention relates to a gas generator for generating a driving gas for a vehicle safety device, for example for a belt tensioner device, a belt winder and/or an airbag.

International patent application WO2013/075710 A2 discloses a gas generator for generating a driving gas for a vehicle safety device, wherein the gas generator comprises: an ignition device; fuel which, after ignition by the ignition device, generates the driving gas; a tubular or at least partially tubular carrier element, the tube interior of which contains a combustion chamber for the fuel and which has a connection hole for the ignition device; an injection-molded body which fixes the ignition device in the connection hole and is situated with an inner portion inside the carrier element and with an outer portion outside the carrier element; a supply pipe which is connected to a tube end of the carrier element and conducts the driving gas out of the combustion chamber; and a lid which seals the combustion chamber and which, before ignition of the ignition device, separates the combustion chamber from the supply pipe.

The invention is based on the object of improving a gas generator of the type described above.

According to the invention, this object is achieved with a gas generator having the features of claim 1. Advantageous embodiments of the gas generator according to the invention are described in the subclaims.

According to the invention, it is provided that the injection-molded body has a sleeve-like portion which lies against an inner wall of the carrier element and extends inside the carrier element up to the lid, so that the injection-molded body and the lid delimit the combustion chamber towards the outside, the carrier element and the supply pipe are screwed together, and the pipe end of the supply pipe facing the carrier element presses the lid onto the circumferential sleeve edge of the sleeve-like portion remote from the ignition device.

An advantage of the gas generator according to the invention is that the supply pipe and the carrier element—with respect to the rotational angle between the two parts—can be twisted relative to each other during installation, and a desired rotational angle between the components may be set without adversely affecting the sealing effect of the lid which lies on the sleeve-like portion. In concrete terms, this is because the lid and/or the sleeve-like portion can at least slightly deform and yield when the supply pipe is pressed on. In the case of an injection-molded body made of plastic, for example a rotational angle range of up to ±180° may be achieved between the supply pipe and the carrier element.

It is advantageous if the carrier element has an internal thread and the supply pipe has an external thread, and the external thread of the supply pipe is screwed into the internal thread of the carrier element.

The combustion chamber is preferably delimited physically exclusively by the injection-molded body and the lid. In this variant, the fuel is thus enclosed by the injection-molded body and the lid.

With a view to dissipating any over-pressure inside the carrier element, in particular in the case of a malfunction or misuse of the vehicle safety device fed by the gas generator, it is considered advantageous if the carrier element has a drainage hole leading radially towards the outside in the region of the combustion chamber. The drainage hole is closed by a closure portion of the injection-molded body and together therewith forms a valve of the gas generator which, in open state, allows the driving gas to escape radially towards the outside. In this variant, the injection-molded body offers a further function: not only does it fix the ignition device in the connection hole and allow the above-mentioned facility of setting a desired rotational angle between the carrier element and the supply pipe, but in addition it forms a valve in the case of a malfunction or misuse. In other words, a synergy effect is created, which is based on the knowledge that an injection-molded material is at least slightly deformable and allows adjustment of the rotational angle, and in addition may function as a valve. The opening of the valve may be achieved by a melting of the closure portion; in this case, the valve is a melt valve. Alternatively or additionally, it may be provided that the opening of the valve is achieved by an at least partial bursting of the injection-molded body and expulsion of the closure portion; in this case, the valve is an over-pressure valve.

With a view to compact accommodation of the gas generator in or on a vehicle safety device, it is considered advantageous if the connection hole, at which the ignition device is fixed by means of the inserted or attached injection-molded body, is situated in the outer wall of a tubular portion of the carrier element, and the injection-molded body extends outwardly through the connection hole in an extension direction which is arranged at an angle, in particular a right angle, to the longitudinal direction of the tubular portion of the carrier element. In this embodiment, the ignition device and the injection-molded body may for example be mounted perpendicularly to the supply pipe, whereby a particularly compact construction of the entire arrangement can be achieved.

In another embodiment, also regarded as advantageous, it is provided that the connection hole, at which the ignition device is fixed by means of the inserted or attached injection-molded body, is formed by a tube end of the carrier element remote from the supply pipe. In this variant, the carrier element may for example be formed by a tube and thus form a drive tube.

In the latter variant, it is advantageous if the tube end of the carrier element facing the supply pipe, and the tube end of the carrier element remote from the supply pipe, are axially arranged or are aligned.

It is also advantageous if the opening diameter of the carrier element is reduced at the tube end remote from the supply pipe, and the injection-molded body is inserted in the tube end of the carrier element with reduced diameter.

The outer portion of the injection-molded body preferably forms a contact sleeve portion which outwardly surrounds the electrical connection elements of the ignition device which are guided out of the carrier element.

The contact sleeve portion is preferably formed such that it can receive an electrical interface element for electrical contacting of the electrical connection elements of the ignition device.

A middle portion is preferably arranged between the inner portion of the injection-molded body and the outer portion of the injection-molded body, the diameter of the middle portion being smaller than that of the inner and outer portions.

The diameter of the connection hole, at which the ignition device is connected by means of the inserted or attached injection-molded body, preferably corresponds to the diameter of the middle portion.

In the case of a tube as the carrier element, it is advantageous if the opening diameter of the carrier element is reduced at the tube end remote from the supply pipe, and the diameter of the middle portion corresponds to the reduced opening diameter of the carrier element at the tube end.

The invention also concerns a gas generator for generating a driving gas for a vehicle safety device, wherein the gas generator comprises: an ignition device; fuel which, after ignition by the ignition device, generates the driving gas; a tubular or at least partially tubular carrier element, the tube interior of which contains a combustion chamber for the fuel and which has a connection hole for the ignition device; an injection-molded body which fixes the ignition device in the connection hole and is situated with an inner portion inside the carrier element and with an outer portion outside the carrier element; a supply pipe which is connected to a tube end of the carrier element and conducts the driving gas out of the combustion chamber; and a lid which seals the combustion chamber and which, before ignition of the ignition device, separates the combustion chamber from the supply pipe; characterized in that the carrier element has a drainage hole leading radially towards the outside in the region of the combustion chamber, and the drainage hole is closed by a closure portion of the injection-molded body and together therewith forms a valve of the gas generator which, in open state, allows the driving gas to escape radially towards the outside. With respect to advantageous embodiments of this invention, the statements above apply accordingly; the features listed above may also be used advantageously in this invention.

In addition, the invention relates to a gas generator for generating a driving gas for a vehicle safety device, wherein the gas generator comprises: an ignition device; fuel which, after ignition by the ignition device, generates the driving gas; a tubular or at least partially tubular carrier element, the tube interior of which contains a combustion chamber for the fuel and which has a connection hole for the ignition device; an injection-molded body which fixes the ignition device in the connection hole and is situated with an inner portion inside the carrier element and with an outer portion outside the carrier element; a supply pipe which is connected to a tube end of the carrier element and conducts the driving gas out of the combustion chamber; and a lid which seals the combustion chamber and which, before ignition of the ignition device, separates the combustion chamber from the supply pipe; characterized in that the connection hole, at which the ignition device is fixed by means of the inserted or attached injection-molded body, is situated in the outer wall of a tubular portion of the carrier element, and the injection-molded body extends outwardly through the connection hole in an extension direction which is arranged at an angle, in particular a right angle, to the longitudinal direction of the tubular portion of the carrier element. With respect to advantageous embodiments of this invention, the statements above apply accordingly; the features listed above may also be used advantageously in this invention.

The invention is explained in more detail below with reference to exemplary embodiments; here, the drawings show as an example FIG. 1 an exemplary embodiment of a gas generator according to the invention in cross-section, FIG. 2 an exemplary embodiment of a gas generator according to the invention which is also equipped with a valve, FIG. 3 an exemplary embodiment of a gas generator according to the invention in which an ignition device is not arranged axially, as in the exemplary embodiments according to FIGS. 1 and 2, but radially, and FIG. 4 the exemplary embodiment from FIG. 3 with an additional valve.

In the figures, for the sake of clarity, the same reference signs are always used for identical or comparable components.

FIG. 1 shows a gas generator 10 in cross-section. The drawing shows a tubular carrier element which is formed by a drive tube 20. A supply pipe 30 of the gas generator 10 is screwed onto the right-hand tube end 21 of the drive tube 20 in FIG. 1. It is advantageous if an internal thread 22 is cut or provided in the region of the tube end 21 of the drive tube 20, into which an external thread 31 of the supply pipe 30 is screwed.

The left-hand tube end 23 of the drive tube 20 in FIG. 1, which is remote from the supply pipe 30, is reduced in diameter, for example by plastic deformation. The tube end 23 of the drive tube 20 forms a connection hole 24 in which the injection-molded body 40 is inserted or attached during molding.

The injection-molded body 40 has a sleeve-like portion 41 which is arranged inside the drive tube 20. The sleeve-like portion 41 lies against an inner wall 25 of the drive tube 20 and extends in the drive tube 20 from the connection hole 24 up to a lid 50. The lid 50 lies on a circumferential sleeve edge 41a of the sleeve-like portion 41 of the injection-molded body 40.

FIG. 1 shows that the lid 50 is arranged between the sleeve edge 41a of the sleeve-like portion 41 and the supply pipe 30 such that the supply pipe 30, which is screwed to the drive tube 20, presses the lid 50 onto the sleeve edge 41a.

The sleeve-like portion 41 and the lid 50 delimit a combustion chamber 60 of the gas generator 10 which contains fuel 70.

The injection-molded body 40 also has, as well as the sleeve-like portion 41 situated inside the drive tube 20, a middle portion 42 and an outer portion 43. The middle portion 42 extends through the connection hole 24 of the drive tube 20 and fixes the injection-molded body 40 relative to the drive tube 20.

The outer or external portion 43 of the injection-molded body 40 forms a contact sleeve portion which outwardly or radially surrounds the electrical connection elements 81 of an ignition device 80 which are guided out of the drive tube 20.

The ignition device 80 is partially embedded in the injection-molded body 40 and is held inside the drive tube 20 by the injection-molded body 40. The drive device 80 serves to ignite the fuel 70 in the combustion tube 60 when an electrical ignition signal is applied to the electrical connection elements 81 of the ignition device 80.

In the exemplary embodiment in FIG. 1, the receiving space for the fuel 70 (or the combustion chamber 60) is delimited exclusively by the sleeve-like portion 41 and the lid 50. When the lid 50 is pressed onto the sleeve edge 41a of the sleeve-like portion 41 by the supply pipe 30, the receiving space for the fuel 70 (or the combustion chamber 60) is sealed tightly, preferably hermetically, before ignition of the ignition device 80.

Since injection molding materials such as plastic or casting resin are usually at least slightly plastically and/or elastically deformable, the gas generator 10 in FIG. 1 has the advantage that, when the supply pipe 30 is screwed onto the drive tube 20, it can press the lid 50 in the direction of the tube end 23 under deformation of the sleeve-like portion 41, so that the relative rotational angle between the supply pipe 30 and the drive tube 20 can be adjusted. Depending on the material of the injection-molded body 40, it is possible to twist the drive tube 20 relative to the supply pipe 30 by up to or even more than ±180° without adversely affecting the sealing effect of the lid 50 on the sleeve edge 41a. In other words, it is thus possible to adjust the rotational angle between the supply pipe 30 and the drive tube 20 virtually arbitrarily during mounting of the gas generator 10 on or in a vehicle safety device, for example a belt tensioner or belt winder or airbag device, for example in order to be able to align the electrical connection elements 81 relative to an external electrical plug or external electrical socket (not shown in FIG. 1), without adversely affecting the sealing effect of the lid 50 on the sleeve edge 41a.

The gas generator 10 preferably functions as follows:

When an ignition signal is applied to the electrical connection elements 81, the ignition device 80 is ignited and ignites the fuel 70 present in the combustion chamber 60. The ignited fuel 70 generates a driving gas G which abruptly increases the pressure inside the combustion chamber 60 and leads to tearing of the lid 50. The driving gas G can thus exit the drive tube 20 through the burst lid 50 and be conducted by the supply pipe 30 either to a belt tensioner device, a belt winder and/or an airbag device.

Figure 2:
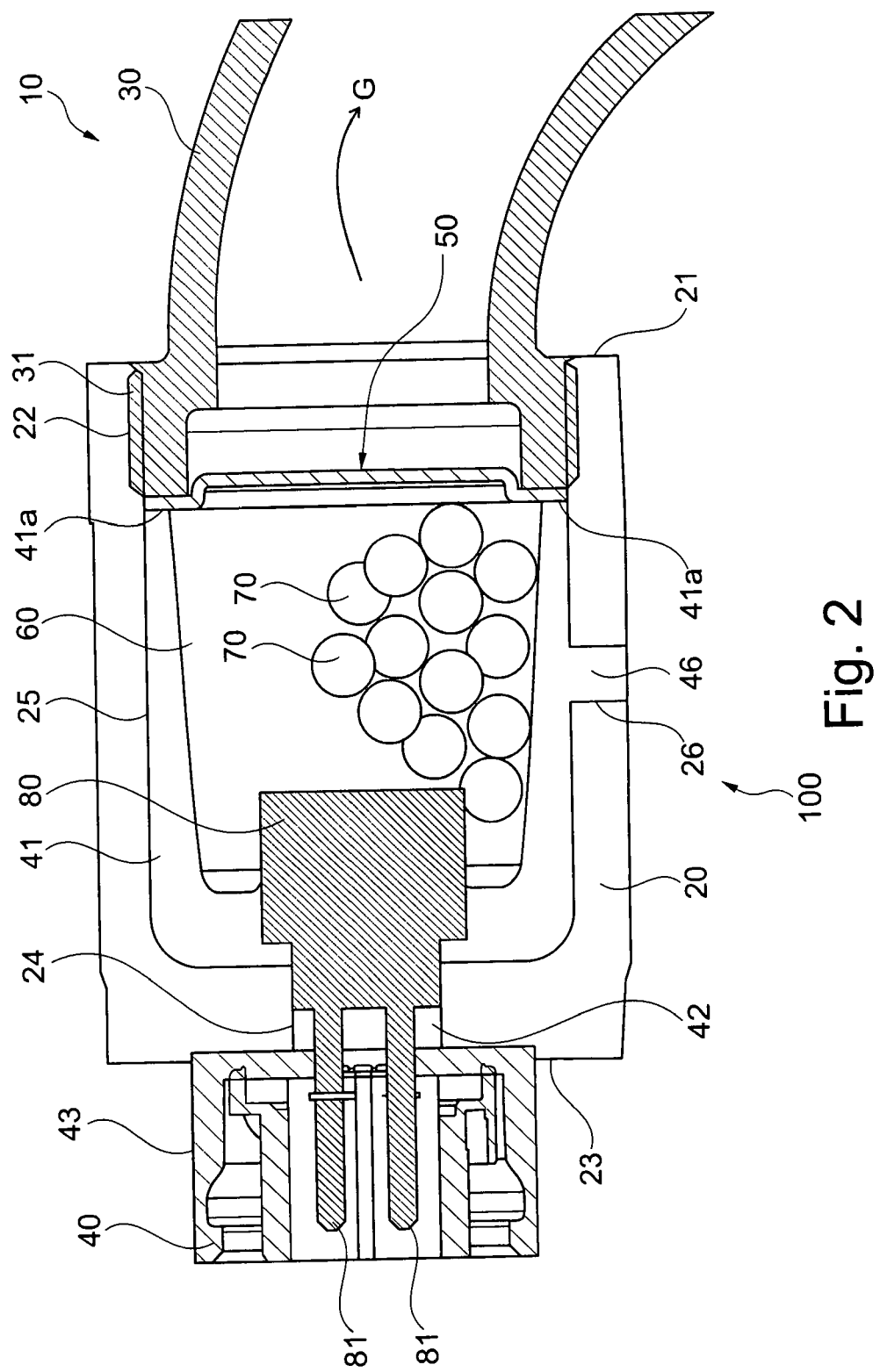

FIG. 2 shows an exemplary embodiment of a gas generator 10 which in its inner structure corresponds substantially to the gas generator 10 in FIG. 1. In contrast to the exemplary embodiment according to FIG. 1, the drive tube 20 of the gas generator 10 in FIG. 2 has a drainage hole 26 which leads radially towards the outside in the region of the combustion chamber 60 and is closed by a closure portion 46 of the injection-molded body 40. The closure portion 46 of the injection-molded body 40, together with the drainage hole 26 in the drive tube 20, forms a valve 100 of the gas generator 10 which, in open or melted state of the closure portion 46, allows the driving gas G to escape radially towards the outside.

The valve 100 or the closure portion 46 present in the drainage hole 26 melts and opens the drainage hole 26, if dissipation of the driving gas G from the drive tube 20 is blocked for any reason and the hot driving gas G builds up in the combustion chamber 60. Alternatively or additionally, the closure portion 46 may break away from the remainder of the injection-molded body 40 purely due to over-pressure and be expelled from the drainage hole 26.

Figure 3:
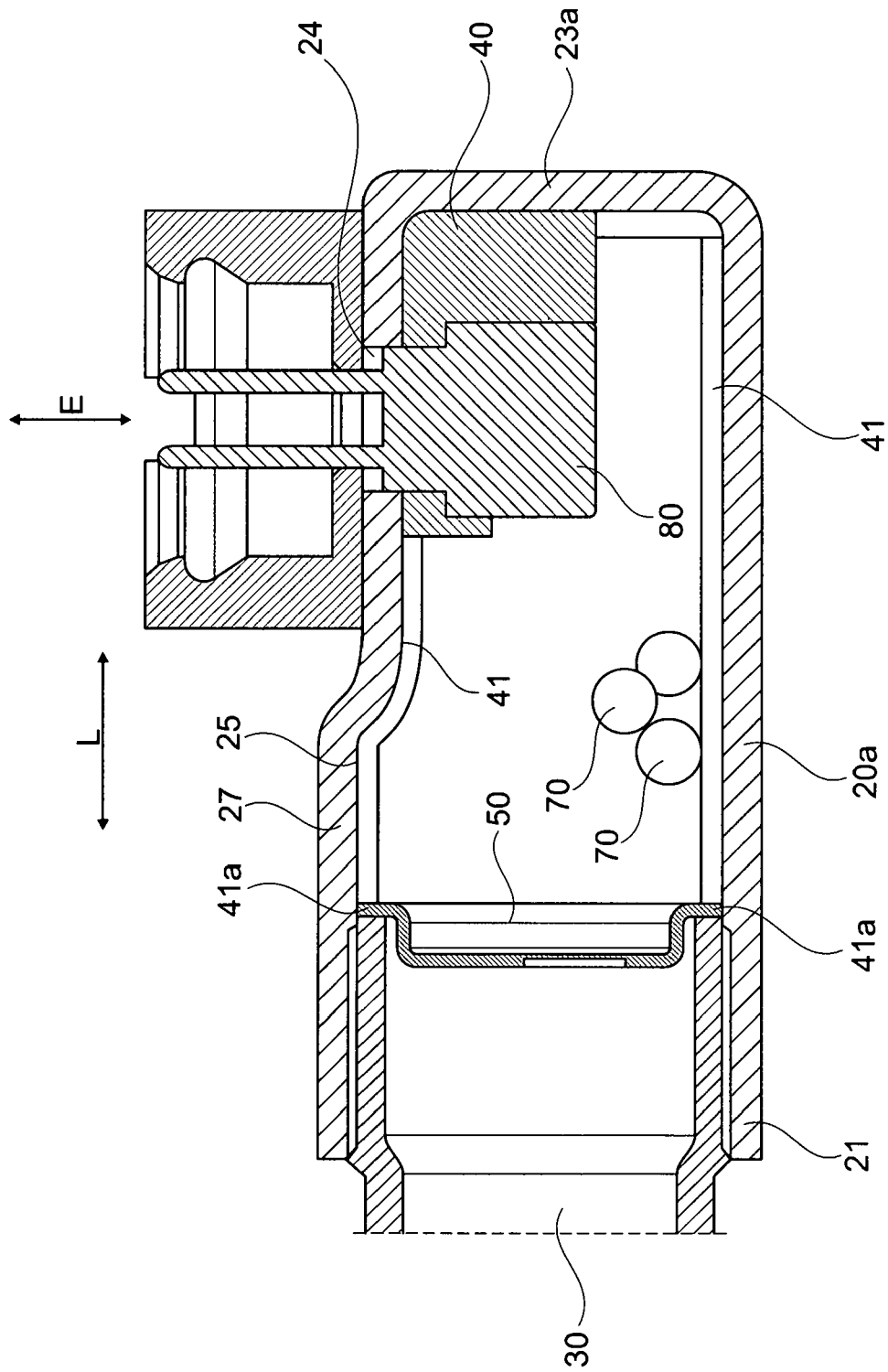
Figure 4:
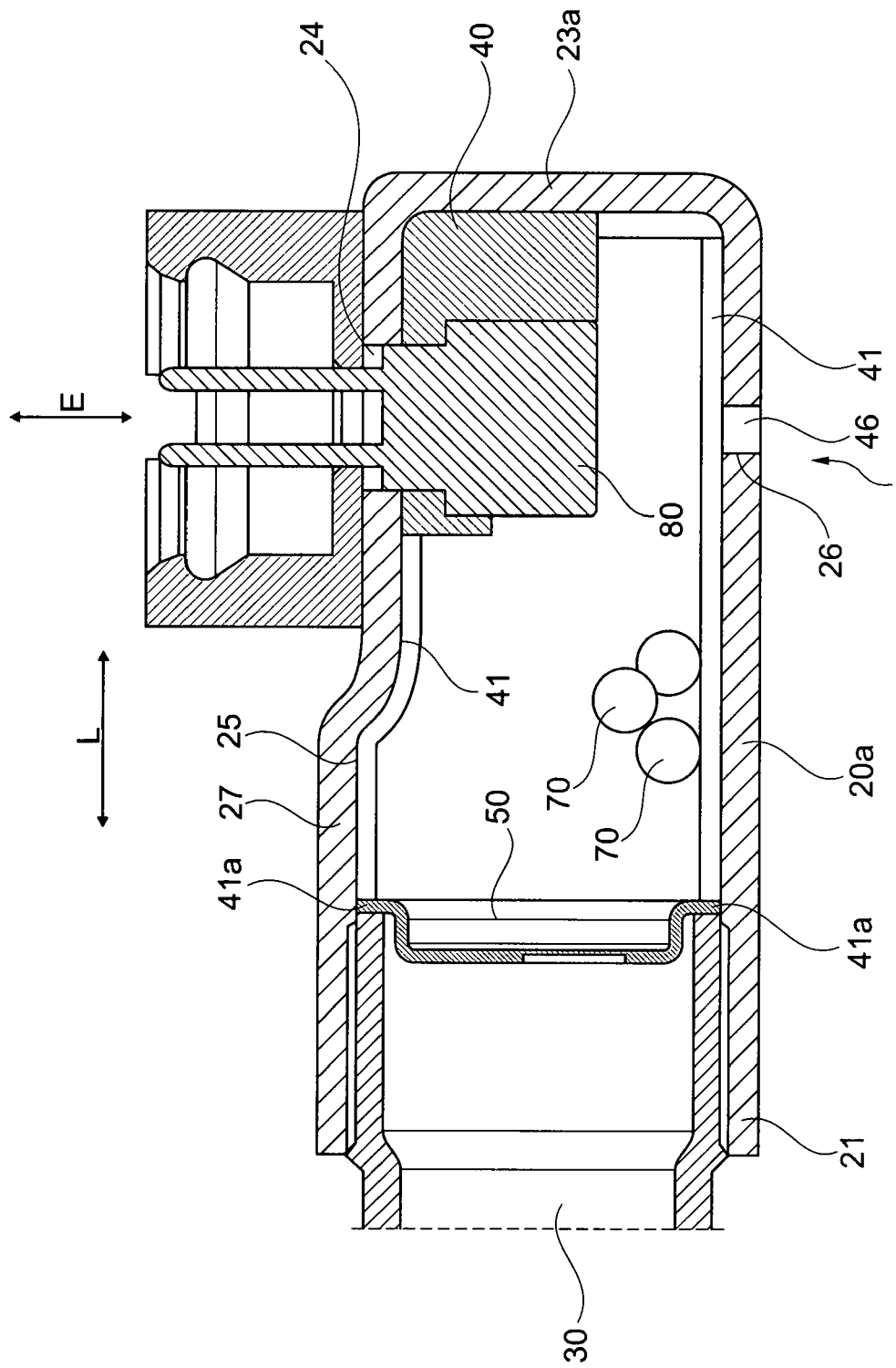

FIG. 3 shows an exemplary embodiment of a gas generator 10 which in its structure corresponds substantially to the gas generator 10 in FIG. 1. In contrast to the exemplary embodiment in FIG. 1, in the exemplary embodiment in FIG. 3, the carrier element (marked with reference sign 20a) is not continuously tubular but only tubular in portions. The carrier element 20a is closed in the region of the end 23a remote from the supply pipe 30. The partly tubular carrier element 20a may for example be formed by plastic deformation of a base tube which is reshaped such that, as shown, the connection hole 24 for the injection-molded body 40 no longer aligns axially with the tube end 21 but lies radially on the outer wall 27 of the tubular portion of the carrier element 20.

Alternatively, the merely partially tubular carrier element 20a shown in FIG. 3 may also be a pot-like element, preferably made of metal, which was produced by deep-drawing or casting. The circumferential pot wall then forms a tubular portion of the carrier element, and a tube end 21 of the tubular portion lies axially opposite the pot base.

In the exemplary embodiment in FIG. 3, the inserted or attached injection-molded body 40 may therefore be arranged not axially to the tube longitudinal direction L of the tubular portion of the carrier element 20a, or axially to the longitudinal direction of the supply pipe 30 (in the connecting region to the drive tube 20), but at right angles thereto. In other words, the extension direction E of the injection-molded body 40 and hence that of the ignition device 80 extends at right angles to the longitudinal direction L of the tubular portion of the carrier element 20a.

A valve, such as for example the valve 100 in FIG. 2, may also be provided in the angular embodiment according to FIG. 3. Such an embodiment is shown in FIG. 4.

Although the invention has been illustrated and described in detail with reference to preferred exemplary embodiments, the invention is not restricted by the examples disclosed and other variants may be derived by the person skilled in the art without leaving the scope of protection of the invention.

LIST OF REFERENCE SIGNS

10 Gas generator
20 Drive tube
20a Carrier element
21 Tube end
22 Internal thread
23 Tube end
23a Remote end
24 Connection hole
25 Inner wall
26 Drainage hole
27 Outer wall
30 Supply pipe
31 External thread
40 Injection-molded body
41 Portion
41a Sleeve edge
42 Portion
43 Portion
46 Closure portion
50 Lid
60 Combustion chamber
70 Fuel
80 Ignition device
81 Connection elements
100 Valve
E Extension direction
G Driving gas
L Longitudinal direction

The invention claimed is:

1. A gas generator (10) for generating a driving gas (G) for a vehicle safety device, wherein the gas generator (10) comprises:
   an ignition device (80),
   fuel (70) which, after ignition by the ignition device (80), generates the driving gas (G),
   a tubular or at least partially tubular carrier element (20, 20a), a tube interior of which contains a combustion chamber (60) for the fuel (70), and which has a connection hole (24) for the ignition device (80),
   an injection-molded body (40) which fixes the ignition device (80) in the connection hole (24) and is situated with an inner portion inside the carrier element (20, 20a) and with an outer portion (43) outside the carrier element (20, 20a),
   a supply pipe (30) which is connected to a tube end (21) of the carrier element (20, 20a) and conducts the driving gas (G) out of the combustion chamber (60), and
   a lid (50) which seals the combustion chamber (60) and which, before ignition of the ignition device (80), separates the combustion chamber (60) from the supply pipe (30), characterized in that the injection-molded body (40) has a sleeve portion (41) which lies against an inner wall (25) of the carrier element (20, 20a) and extends inside the carrier element (20, 20a) up to the lid (50), so that the injection-molded body (40) and the lid (50) delimit the combustion chamber (60) towards the outside, the carrier element (20, 20a) and the supply pipe (30) are screwed together, and the pipe end of the supply pipe (30) facing the carrier element (20, 20a) presses the lid (50) onto the circumferential sleeve edge (41a) of the sleeve portion (41) remote from the ignition device (80).

2. The gas generator (10) as claimed in claim 1, characterized in that the carrier element (20, 20a) has an internal thread (22) and the supply pipe (30) has an external thread (31), and the external thread (31) of the supply pipe (30) is screwed into the internal thread (22) of the carrier element (20, 20a).

3. The gas generator (10) as claimed in claim 1, characterized in that the combustion chamber (60) is delimited physically exclusively by the injection-molded body (40) and the lid (50).

4. The gas generator (10) as claimed in claim 1, characterized in that the carrier element (20, 20a) has a drainage hole (26) leading radially towards the outside in the region of the combustion chamber (60), and the drainage hole (26) is closed by a closure portion (26) of the injection-molded body (40) and together therewith forms a valve (100) of the gas generator (10) which, in an open state, allows the driving gas (G) to escape radially towards the outside.

5. The gas generator (10) as claimed in claim 1, characterized in that the connection hole (24), at which the ignition device (80) is fixed by means of an inserted or attached injection-molded body (40), is situated in the outer wall (27) of a tubular portion of the carrier element (20, 20a), and the injection-molded body (40) extends outwardly through the connection hole (24) in an extension direction (E) which is arranged at an angle, a right angle, to the longitudinal direction (L) of the tubular portion of the carrier element (20, 20a).

6. The gas generator (10) as claimed in claim 1, characterized in that the connection hole (24), at which the ignition device (80) is fixed by means of an inserted or attached injection-molded body (40), is formed by a tube end (23) of the carrier element (20, 20a) remote from the supply pipe (30).

7. The gas generator (10) as claimed in claim 6, characterized in that the tube end (21) of the carrier element (20, 20a) facing the supply pipe (30), and the tube end (23) of the carrier element (20, 20a) remote from the supply pipe (30) are axially arranged or are aligned.

8. The gas generator (10) as claimed in claim 6, characterized in that the opening diameter of the carrier element (20, 20a) is reduced at the tube end (23) remote from the supply pipe (30), and the injection-molded body (40) is inserted in the tube end of the carrier element (20, 20a) with reduced diameter.

9. The gas generator (10) as claimed in claim 1, characterized in that the outer portion (43) of the injection-molded body (40) forms a contact sleeve portion which outwardly surrounds electrical connection elements (81) of the ignition device (80) which are guided out of the carrier element (20, 20a).

10. The gas generator (10) as claimed in claim 9, characterized in that the contact sleeve portion is formed such that it can receive an electrical interface element for electrical contacting of the electrical connection elements (81) of the ignition device (80).

11. The gas generator (10) as claimed in claim 1, characterized in that a middle portion (42) is arranged between the inner portion of the injection-molded body (40) and the outer portion of the injection-molded body (40), the diameter of the middle portion being smaller than that of the inner and outer portions.

12. The gas generator (10) as claimed in claim 11, characterized in that the diameter of the connection hole (24), at which the ignition device (80) is connected by means of an inserted or attached injection-molded body (40), corresponds to the diameter of the middle portion (42).

13. The gas generator (10) as claimed in claim 11, characterized in that the opening diameter of the carrier element (20, 20a) is reduced at a tube end remote from the supply pipe (30), and the diameter of the middle portion (42) corresponds to a reduced opening diameter of the carrier element (20, 20a) at the tube end.

14. A gas generator (10) for generating a driving gas (G) for a vehicle safety device, wherein the gas generator (10) comprises:

an ignition device (80), fuel (70) which, after ignition by the ignition device (80), generates the driving gas (G), a tubular or at least partially tubular carrier element (20, 20a), a tube interior of which contains a combustion chamber (60) for the fuel (70), and which has a connection hole (24) for the ignition device (80), an injection-molded body (40) which fixes the ignition device (80) in the connection hole (24) and is situated with an inner portion inside the carrier element (20, 20a) and with an outer portion (43) outside the carrier element (20, 20a), a supply pipe (30) which is connected to a tube end of the carrier element (20, 20a) and conducts the driving gas (G) out of the combustion chamber (60), and a lid (50) which seals the combustion chamber (60) and which, before ignition of the ignition device (80), separates the combustion chamber (60) from the supply pipe (30), characterized in that the carrier element (20, 20a) has a drainage hole (26) leading radially towards the outside in the region of the combustion chamber (60), and the drainage hole (26) is closed by a closure portion (26) of the injection-molded body (40) and together therewith forms a valve (100) of the gas generator (10) which, in an open state, allows the driving gas (G) to escape radially towards the outside.

15. A gas generator (10) for generating a driving gas (G) for a vehicle safety device, wherein the gas generator (10) comprises:

an ignition device (80), fuel (70) which, after ignition by the ignition device (80), generates the driving gas (G), a tubular or at least partially tubular carrier element (20, 20*a*), a tube interior of which contains a combustion chamber (60) for the fuel (70), and which has a connection hole (24) for the ignition device (80), an injection-molded body (40) which fixes the ignition device (80) in the connection hole (24) and is situated with an inner portion inside the carrier element (20, 20*a*) and with an outer portion (43) outside the carrier element (20, 20*a*), a supply pipe (30) which is connected to a tube end of the carrier element (20, 20*a*) and conducts the driving gas (G) out of the combustion chamber (60), and a lid (50) which seals the combustion chamber (60) and which, before ignition of the ignition device (80), separates the combustion chamber (60) from the supply pipe (30), characterized in that the connection hole (24), at which the ignition device (80) is fixed by means of an inserted or attached injection-molded body (40), is situated in the outer wall (27) of a tubular portion of the carrier element (20, 20*a*), and the injection-molded body (40) extends outwardly through the connection hole (24) in an extension direction (E) which is arranged at an angle, in particular a right angle, to the longitudinal direction (L) of the tubular portion of the carrier element (20, 20*a*).

\* \* \* \* \*